United States Patent [19]

Yamashita et al.

[11] Patent Number: 4,657,818

[45] Date of Patent: Apr. 14, 1987

[54] SLIDING CURRENT COLLECTOR

[75] Inventors: Nobuyuki Yamashita; Kazuo Tahara; Masatoshi Watanabe; Noriyoshi Takahashi, all of Hitachi, Japan

[73] Assignee: Hitachi, Ltd., Tokyo, Japan

[21] Appl. No.: 744,194

[22] Filed: Jun. 13, 1985

[30] Foreign Application Priority Data

Jun. 18, 1984 [JP] Japan ................................ 59-123845

[51] Int. Cl.[4] ................................................ B32B 9/04

[52] U.S. Cl. .................................... 428/446; 339/6 R; 339/8 R; 339/278 C

[58] Field of Search .......... 339/6 R, 8 R, 9 R, 278 C; 428/446

[56] References Cited

U.S. PATENT DOCUMENTS 3,153,163 10/1964 Foldes et al. ........................ 339/5 R
4,123,122 10/1978 Gabrielson et al. ................ 308/238
4,409,295 10/1983 Smith et al. .......................... 428/591
4,488,771 12/1984 Koford ................................ 528/185

FOREIGN PATENT DOCUMENTS 9232981 12/1984 Japan .

*Primary Examiner*—Edith Buffalow
*Attorney, Agent, or Firm*—Antonelli, Terry & Wands

[57] ABSTRACT

A sliding current collector comprises a pair of sliding members which are slidable relative to each other for supply and reception of current through sliding surfaces of the paired sliding members wherein the two sliding members are made of conductive ceramics, and the sliding surface of each of the sliding members has a film surface made of a soft conductive material which is softer than the conductive ceramics so that the sliding current collector can suppress variations in contact voltage drop across the sliding surfaces.

7 Claims, 12 Drawing Figures

SLIDING CURRENT COLLECTOR

BACKGROUND OF THE INVENTION

This invention relates to a sliding current collector and more particularly a sliding current collector of the type suitable for a slip ring or a commutator of a rotary electric machine.

Generally, in electric machines utilizing electric energy, a sliding current collector is used for supplying a current to a moving part thereof, for example, for supplying a field current in a rotary-field type AC generator, supplying an armature current in a rotary-armature type DC motor and supplying electric power in an electric car.

The sliding current collector has a pair of current collecting members which are slidable relative to each other and electrically connected together for supplying a current from one to the other, and hence the condition in contact between sliding surfaces of the members is very important for providing good function and reliable operation of the sliding current collector.

Since it is unavoidable that the sliding current collector will be subject to wear when used for a long time, it is particularly designed in consideration of ease of maintenance and replacement. For example, one of the current collecting members which can be repaired or replaced only through time-consuming labor is made of a metallic material such as copper, steel or iron which is durable against wear while the other current collecting member is made of a material such as sintered copper powder which wears more easily than the one member. However, in the event that a spark is generated across the sliding surfaces owing to the electrical polarity (positive or negative) difference and defective sliding contact, these members undergo burn-out damage which grows with time or unforeseen abnormal wear occurs.

Under the circumstances, the present inventors have studied conductive ceramics which are durable against oxidization as a material for the paired sliding members of the current collector.

To prepare the conductive ceramics, a ceramic substrate, such as SiC (silicon carbide) or $Si_3N_4$ (silicon nitride), is mixed with a conductive additive such as $ZrB_2$ (zirconium boride), TiN (titanium nitride) and $HfB_2$ (hafnium boride) at various ratios and the mixture is sintered at a high temperature. For example, when a mixture of SiC and $ZrB_2$ is used, the mixture is composed of SiC of 10–60%, preferably 20% in weight and $ZrB_2$ of 40–90%, preferably 80%, in weight of the total mixture. Through the high temperature sintering, there is produced a solid hard body composed of polycrystalline fine grains of SiC or $Si_3N_4$. The ceramic grain in the resulting body has a size of equivalent diameter 0.5–5 $\mu$m and 2 $\mu$m in average, although its shape is not always spherical but is sometimes spiky.

An example of a current collector using the conductive ceramics described above will now be explained with reference to FIG. 10.

As shown in FIG. 10, the current collector comprises a collector shoe 1, acting as one sliding member, and a collector ring 2, acting as the other sliding member, having a surface extending in the direction of its movement. The two sliding members are made of conductive ceramics. The collector shoe 1 is pressed against the surface of the collector ring 2 with a pressure P to make sliding contact therewith.

With the current collector of the above construction, variation of contact voltage drop V was monitored and measured over period of time T when the collector was used and it was found that the contact voltage drop V varied greatly as shown in FIG. 12. The inventors of this application investigated a cause for this great variation in the contact voltage drop and found that differently shaped grains 1C and 2C of the conductive ceramics were irregularly aggregated to form finely rugged contact surfaces of the collector shoe 1 and collector ring 2, as best seen from FIG. 11 which is an enlarged view of a portion B including the sliding surfaces, and concluded that the rugged contact surfaces cause the great variation in the contact voltage drop V.

SUMMARY OF THE INVENTION

An object of this invention is to provide a sliding current collector which can take advantage of properties of conductive ceramics while suppressing variations in contact voltage drop.

To accomplish the above object, according to this invention, there is provided a sliding current collector comprising a pair of sliding members which are slidable relative to each other for providing an electrical contact therebetween, wherein the two sliding members are made of conductive ceramics, and the sliding surface of each of the sliding members is coated with a film of soft conductive material which is softer than the conductive ceramics to provide a uniform contact between the two sliding members.

DESCRIPTION OF THE PREFERRED EMBODIMENTS

Figure 1:
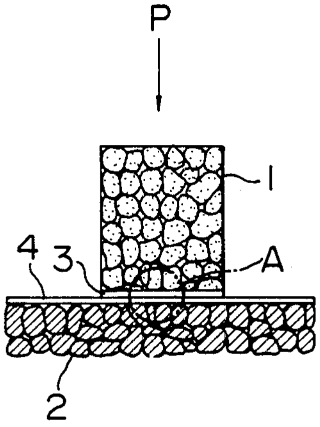
FIG. 1 is a fragmentary sectional view showing a sliding current collector according to an embodiment of the invention.
Figure 2:
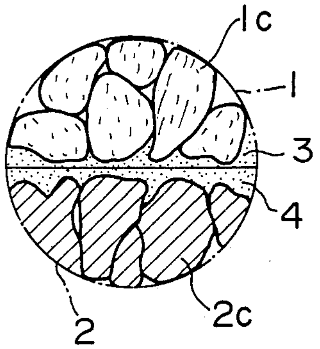
FIG. 2 is an enlarged view of a portion A of the sliding surface in FIG. 1.
Figure 10:
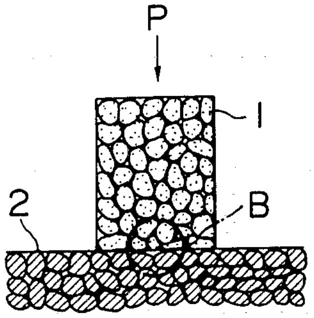
FIG. 10 is a fregmentary sectional view of a sliding current collector made of conductive ceramics without coating of soft conductive material.
Figure 11:
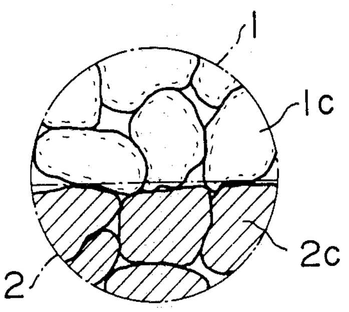
FIG. 11 is an enlarged view of a portion B of the sliding surface in FIG. 10.
Figure 12:
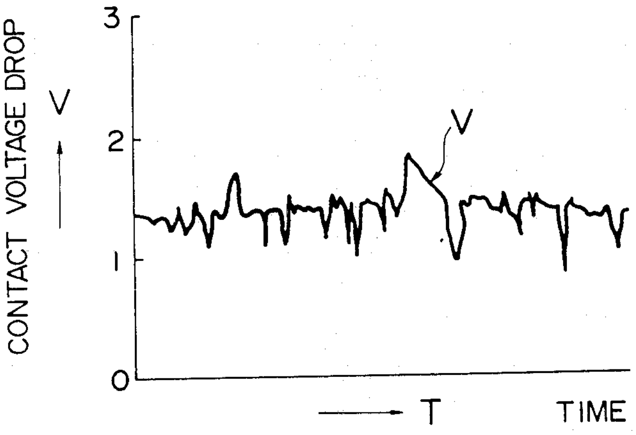
FIG. 12 is a graph showing a time-variable characteristic of contact voltage drop obtained by the current collector of FIG. 10.

Referring now to FIG. 1, a sliding current collector embodying the invention will be described. A pair of current collecting members constituting the sliding current collector are shown as one stationary member and the other rotary member for illustration purpose only, but in general form of practice of the invention, these members may be slidable relative to each other. As shown in FIG. 1, a collector shoe 1 made of conductive ceramics is depressed with a pressure P against a collector ring 2 also made of conductive ceramics to make sliding contact therebetween, thereby establishing an electrical connection between the collector shoe and collector ring. This construction is identical to the construction of FIG. 10 described previously. According to this embodiment of the invention, however, the sliding interface between the collector shoe 1 and collector ring 2 is different from that between the collector shoe and collector ring of FIG. 10. More particularly, as best seen from FIG. 2 which is an enlarged view of a portion A in FIG. 1, the collector shoe 1 has a sliding surface film 3 made of a soft conductive material and the collector ring 2 also has a sliding surface film 4 of the same material. Consequently, the soft conductive material fills in the recesses formed in the sliding surfaces of conductive ceramics to flatten the sliding surfaces of the collector shoe 1 and the collector ring 2. Thus, these sliding surfaces are substantially uniform. The soft conductive material is required to be softer than the conductive ceramics and as an example thereof, graphite is typically used.

Figure 3:
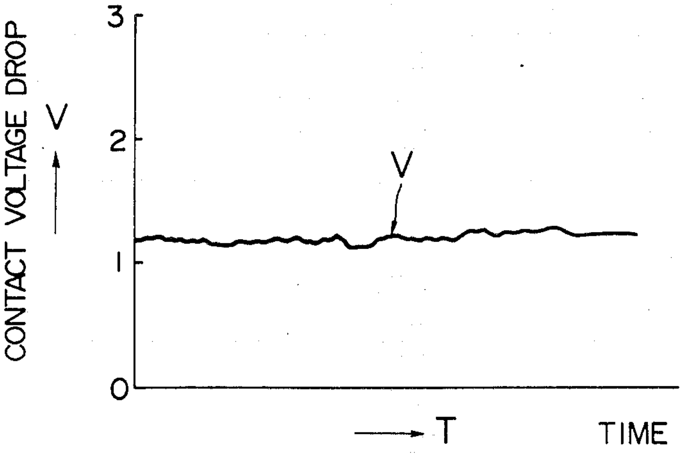
FIG. 3 is a graph showing a time-variable characteristic of contact voltage drop obtained by the current collector of FIG. 1.

With the sliding current collector, contact voltage drop V across the collector shoe 1 and collector ring 2 was measured to obtain a result as graphically shown in FIG. 3. As will been seen from FIG. 3, the contact voltage drop V remains substantially unchanged with the period of time when the collector was used, indicating that a substantially uniform contact can be maintained at the sliding surfaces.

The films 3 and 4 of the soft conductive material are formed in various ways as will be described below. In a first method for formation of the films, the soft conductive film 4 for the collector ring 2 is formed in a manner as illustrated in FIG. 4 and the soft conductive film 3 for the collector shoe 1 is formed in a manner as illustrated in FIG. 5.

Figure 4:
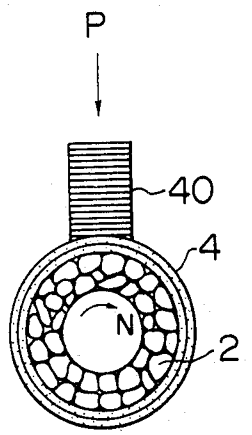
FIGS. 4 to 9 are sectional views showing different examples in formation of soft conductive films of the sliding current collector according to the invention.
Figure 5:
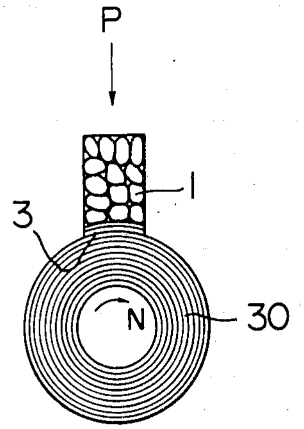

Referring to FIG. 4, a soft conductive rod 40 is pushed against the irregular or uneven surface of the conductive ceramics of collector ring 2 under the application of a pressure P. Under this condition, the collector ring 2 is rotated in a direction N in which the ring 2 is to be rotated in normal operation. Then, the soft conductive rod 40 is shaved off by the irregular surface of the conductive ceramics to produce chip powders which adhere to the surface of the conduc-tive ceramics of the collector ring 2. The adhered chip powders are gradually accumulated to form a glossy smoothed sliding surface with rotation of the collector ring 2.

For the formation of the film 3 applied to the collector shoe 1, the conductive ceramics of the collector shoe 1 is pushed against a drum 30 of soft conductive material configurated as in the same shape as that of the collector ring 2 under the application of pressure P and the drum 30 is rotated in a direction N in which the ring 2, if used, will be driven in normal operation. Consequently, as in the case of the collector ring 2, the soft conductive drum 30 is shaved off by the irregular surface of the conductive ceramics of the collector shoe 1 to ultimately form a smoothed sliding surface on the collector shoe 1.

By taking advantage of the irregular surface of the conductive ceramics and the difference in hardness in this manner, a collector sliding surface is made smooth sufficiently to ensure electrically stable operation. Especially, since, in this embodiment, the rotation direction of the ring 2 or the drum 30 is the same as the direction in which the ring 2 is to be driven in normal operation, the contact voltage drop can be stabilized even in the initial phase of operation of an existing device mounted with the current collector. To summarize, since the soft conductive films are formed by relatively rotating one of the paired collecting members with respect to a member of soft conductive material formed into the same shape as the other collecting member in the same relative sliding direction as the direction in which the paired collecting members are to be slidably moved relative to each other, the current collector can provide stable performance from the beginning of operation when mounted on an existing electric machine, thereby preventing generation of a spark.

Figure 6:
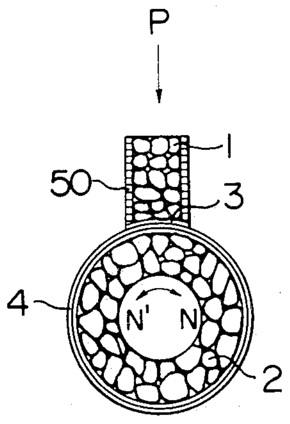

FIG. 6 shows the formation of the soft conductive film in another manner according to the invention, by which the soft conductive films 3 and 4 for the collector shoe 1 and the collector ring 2 can be formed simultaneously. More particularly, soft conductive materials 50 are applied to forward and back sides of the collector shoe 1 of conductive ceramics in the direction N in forward rotation of the collector ring 2 which is also movable for rotation in the reverse direction N'. The soft conductive materials 50 are each arranged to have a lower end slightly projecting beyond the collector shoe 1 by mounting the soft conductive materials 50 movably relative to the collector shoe 1 and pushing each material against the collector ring 2 by a pressure independent of the pressure P applied to the collector shoe 1. When the collector ring 2 is rotated in the directions N and N', alternately, the films 3 and 4 are both formed of the soft conductive materials 50 to provide the sliding surfaces of the collector shoe 1 and the collector ring 2.

Figure 7:
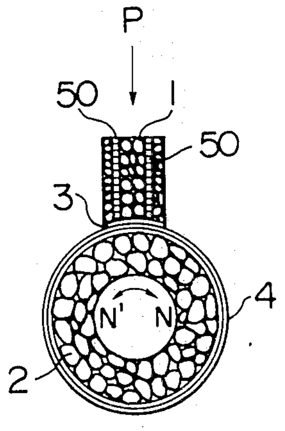

In forming the films according to another embodiment shown in FIG. 7, soft conductive materials 50 are applied to the collector shoe 1 at locations thereof different from those in FIG. 6. More particularly, longitudinal holes are formed in the collector shoe 1 and the soft conductive materials 50 are inserted in the holes. The soft conductive materials 50 are pushed against the collector ring 2 by a suitable pressure independent of the pressure applied to the collector shoe 1, so that the films 3 and 4 are formed in a similar manner to those of FIG. 6.

Figure 8:
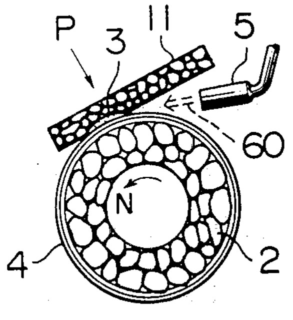

In forming the films according to still another embodiment shown in FIG. 8, a collector shoe 11 takes the form of an elongated plate, and soft conductive powders 60 are sprayed from a nozzle 5 into a space between the collector shoe 11 and collector ring 2 of conductive ceramics. Since the powders are sprayed towards the sliding contact portion between the collector shoe 11 and the collector ring 2 in the direction N in rotation of the collector ring 2 and the collector 11 is depressed against the ring 2 with a suitable pressure P, the soft conductive powders are generally oriented in a direction of rotation of the collector ring 2 so that the films 3 and 4 similar to those of the previous embodiments can be formed.

Figure 9:
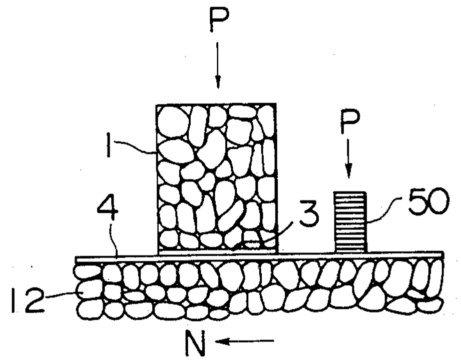

In the previous embodiments of FIGS. 6, 7 and 8, the soft conductive material 50 or the nozzle 5 for spraying the soft conductive powders 60 is used for the formation of the sliding surface films of the collector shoe 1 or 11 and the collector ring 2. But the soft conductive material or member may be arranged to an existing device to ensure that the device can be operated stably for a long term. FIG. 9 shows an embodiment of such arrangement wherein a movable collecting member 12 equivalent to the collector ring 2 has a planar sliding surface which is movable in a direction N relative to the collector shoe 1. In this construction, the soft conductive material 50 is arranged above the member 12 and ahead of the collector shoe 1 in the sliding direction N and is pushed against the movable collector member 12. In this manner, the soft conductive material 50 can be supplied constantly to the current collector and the collector can be operated stably for a long time.

As described above, according to the invention, each of the paired collecting members of conductive ceramics is coated at its sliding surface with a film of soft conductive material which is softer than the conductive ceramics, thereby suppressing variations in the contact voltage drop across the sliding surfaces. In addition, since the soft conductive material is softer than the conductive ceramics, the films of the soft conductive material are readily formed on the sliding surfaces of the two collecting members by making use of the rugged surface of the conductive ceramics of each member.

We claim:

1. A sliding current collector comprising a pair of sliding members which are slidable relative to each other for transmitting a current through sliding surfaces of said paired sliding members from one to the other member, said two sliding members being made of conductive ceramics and each coated at its sliding surface with a film made of a soft conductive material which is softer than the conductive ceramics.

2. A sliding current collector according to claim 1, wherein said conductive ceramics is made of a mixture of a ceramic material selected from SiC and $Si_3N_4$ and an electrically conductive material selected from $ZrB_2$, TiN and $HfB_2$.

3. A sliding current collector according to claim 2, wherein said mixture is composed of SiC of 10–60% in weight and $ZrB_2$ of 40–90% in weight of the total mixture.

4. In a sliding current collector comprising a pair of sliding members which are slidably movable relative to each other for transmitting a current through sliding surfaces of said paired sliding members from one to the other member wherein said two sliding members are made of conductive ceramics, a method for making a film coating of soft conductive material on the sliding surface of each sliding member comprising the steps of:

preparing at least one member of soft conductive material which is softer than the conductive ceramics and pushing said member of soft conductive material against the sliding surface of one of said sliding members.

5. A method according to claim 4, wherein the step of pushing the member of soft conductive material is carried out while moving said one sliding member relatively to the member of soft conductive material in the same direction as the direction in the sliding movement of said one sliding member relative to the other sliding member.

6. A method according to claim 5, wherein the step of pushing the member of soft conductive material is carried out under sliding movement of said one sliding member relative to the other sliding member while disposing the member of soft conductive material at at least one side of said other sliding member.

7. In a sliding current collector comprising a pair of sliding members which are slidably movable relative to each other for transmitting a current through sliding surfaces of said paired sliding members from one to the other member wherein said two sliding members are made of conductive ceramics, a method for making a film coating of soft conductive material on the sliding surface of each sliding member comprising the steps of:

preparing powders of soft conductive material which is softer than the conductive ceramics and spraying the powders between the sliding surfaces of said sliding members while moving said sliding members relative to each other.

* * * * *